March 19, 1957 V. H. HILDEBRANT 2,785,591
SAW GRINDING MACHINE
Filed June 8, 1953 3 Sheets-Sheet 1
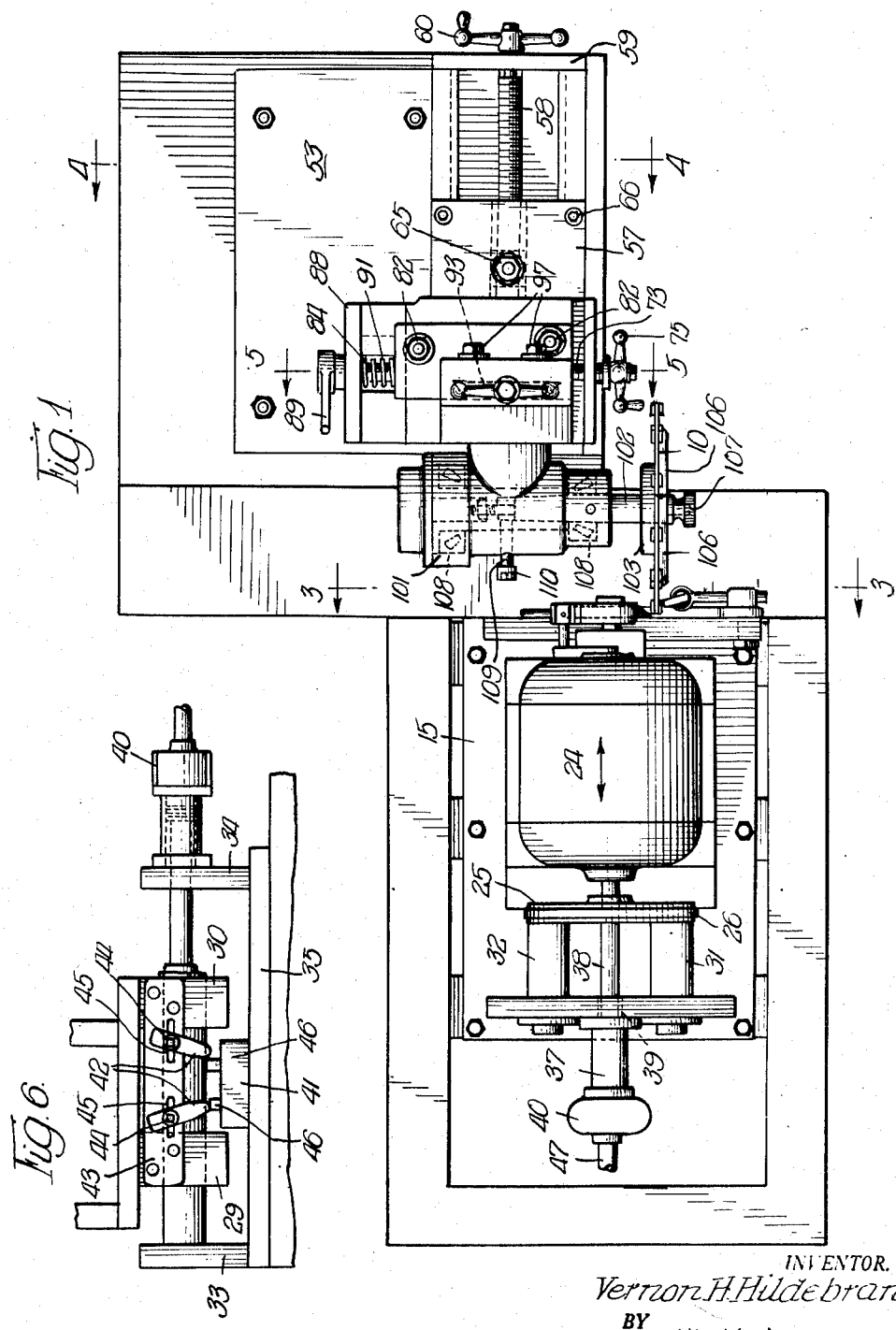
INVENTOR.
Vernon H. Hildebrant,
BY
Cromwell, Greist & Warden
Attys.

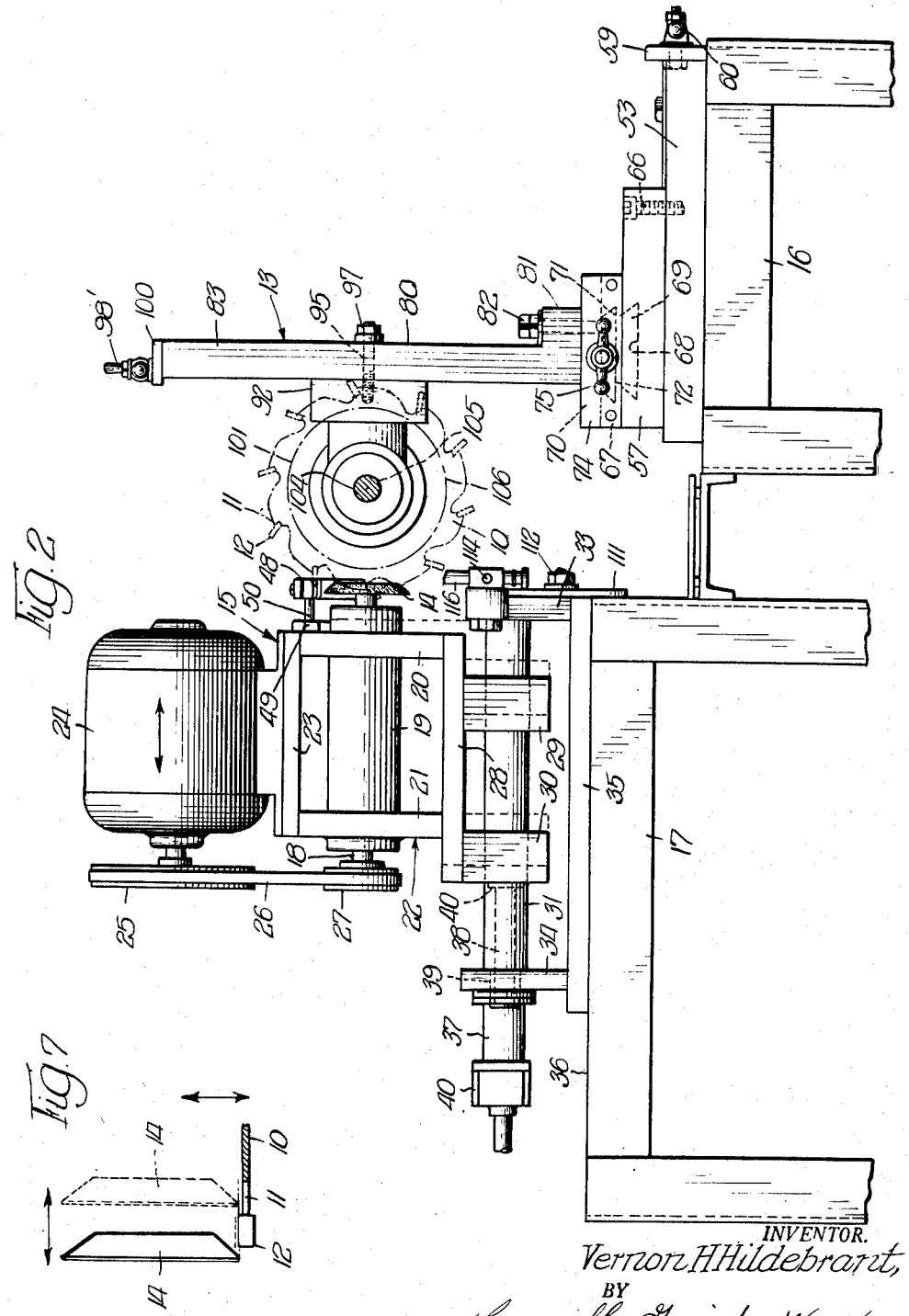

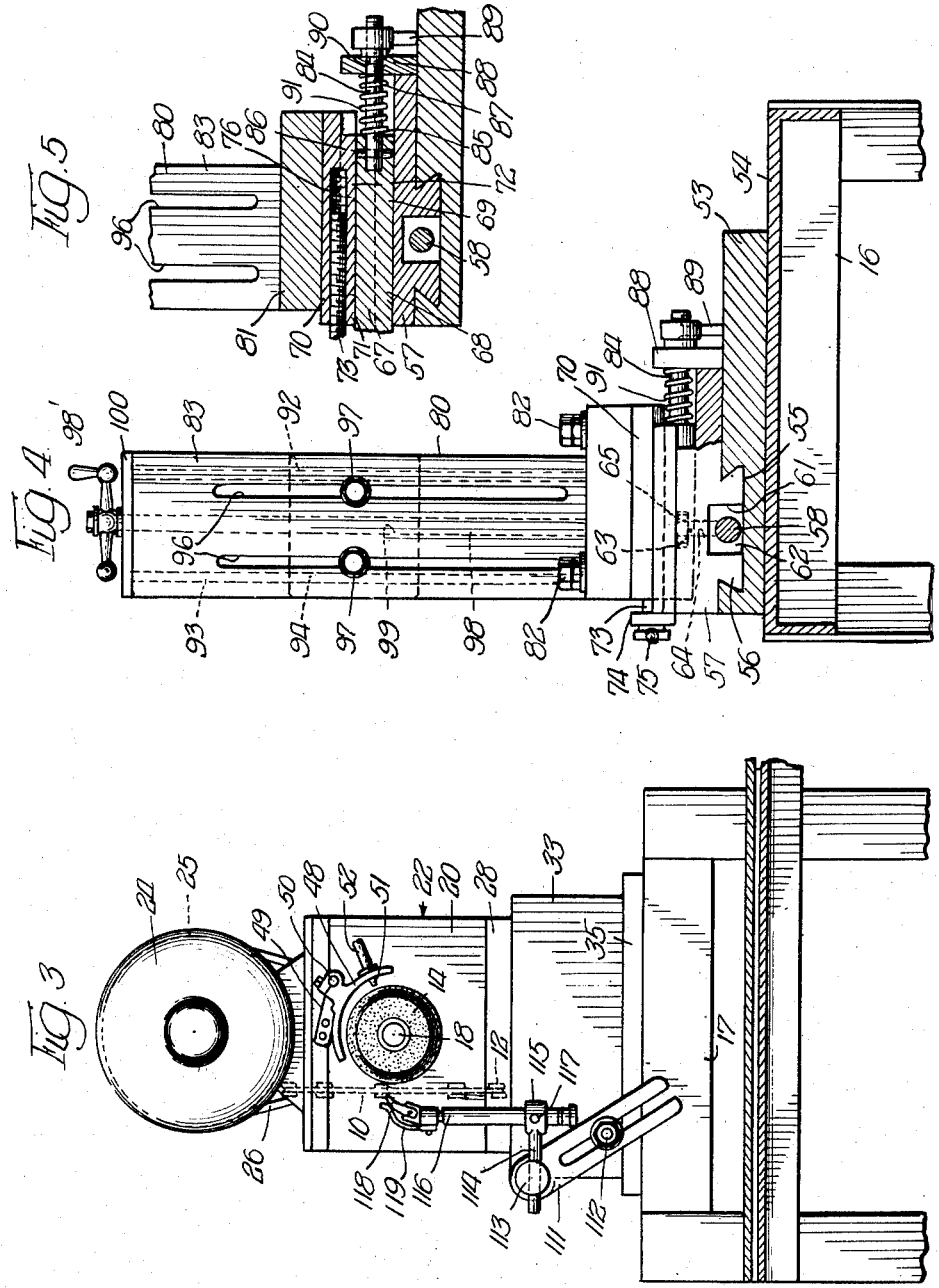

2,785,591

SAW GRINDING MACHINE

Vernon H. Hildebrant, Cincinnati, Ohio, assignor to Yates-American Machine Company, Beloit, Wis., a corporation of Delaware Application June 8, 1953, Serial No. 360,007

1 Claim. (Cl. 76—50)

This invention relates to grinding machines and is more particularly concerned with improvements in a machine primarily intended for use in the grinding and sharpening of the teeth of circular saws.

In the fabrication of circular saws of the tipped tooth type in which the blade is made with a relatively small number of peripherally spaced teeth and each tooth is provided on its cutting face with a relatively small insert or tip of very hard, tough material, such as tungsten carbide, or the like, difficulty has been encountered in grinding the teeth to provide uniform and accurately aligned cutting edges or surfaces. Due to the hardness of the tip material it is desirable to cut off the excess material in relatively small increments in order to avoid uneven cutting which otherwise occurs. Grinding devices heretofore provided for dressing or grinding the teeth of conventional saw blades have not proven satisfactory for grinding the tipped tooth blades, because they are not adapted to be operated to remove the excess material in small enough increments or because they require too much time for the operation.

It is a general object of the present invention to provide a grinding machine for dressing the side faces of the teeth of a circular saw blade in such a manner that the excess material on the side face of each tooth will be removed in relatively small amounts by repeated grinding operations and the tooth will be quickly and accurately ground down the required amount.

It is a more specific object of the invention to provide a saw dressing mechanism in which the grinding wheel is rotatably mounted on a shaft which is supported for axial reciprocation in a predetermined path and in which the saw blade is adapted to be rotatably supported with the face of the blade in a plane parallel to the path of reciprocation of the grinding surface of the wheel and to be moved, under the control of the operator, in a predetermined path laterally of the path of movement of the grinding wheel for repeated grinding operations, the blade being rotated to bring each successive tooth into proper position for engagement of the face thereof by the grinding wheel.

It is a further object of the invention to provide in a saw blade grinding machine a grinding wheel rotatably mounted on a shaft which is supported on a rapidly reciprocating carriage in combination with a movably mounted supporting structure for the saw blade which will maintain the blade in a plane parallel to the path of reciprocation of the cutting edge of the grinding wheel and which is adapted to be moved to gradually bring the face of the blade confronting the grinding wheel into a predetermined position so that the reciprocating grinding wheel will cut or dress the side face of each tooth by repeated passes of the grinding surface of the wheel across the side face of the tooth, as the blade is moved toward the wheel.

It is another object of the invention to provide in a saw blade grinding mechanism a grinding wheel rotatably mounted on a constantly driven shaft which is supported on a rapidly reciprocating frame whereby the grinding edge of the wheel is reciprocated in a predetermined path of relatively small extent while it is rotated for the grinding operation.

It is another object of the invention to provide in a saw grinding mechanism a support for rotatably mounting a saw blade which support is adjustable in all directions to initially position the surface of the blade to be ground relative to the grinding wheel and a manually operated means for reciprocating the support, after it is initially adjusted, in a predetermined path to bring the blade surface into and out of grinding relation with the grinding wheel.

These and other objects and advantages of the invention will be apparent from a consideration of the mechanism which is shown by way of illustration in the accompanying drawings, wherein:

Fig. 1 is a plan view of a saw grinding mechanism which incorporates therein the principal features of the invention;

Fig. 2 is a side elevation of the grinding mechanism;

Fig. 3 is a section taken on the line 3—3 of Fig. 1;

Fig. 4 is a section taken on the line 4—4 of Fig. 1;

Fig. 5 is a section taken on the line 5—5 of Fig. 1;

Fig. 6 is a partial elevation of the opposite side of the machine from that shown in Fig. 2; and Fig. 7 is a partially schematic detail view illustrating the grinding operation.

Referring to the drawings there is illustrated a grinding mechanism which is particularly adapted for dressing a circular saw blade having brazed tips of tungsten carbide or similar material which are provided on a modern tipped tooth safety blade.

As illustrated in Fig. 2 the saw blade 10 which the present mechanism is particularly designed to grind or sharpen has a relatively small number of peripherally spaced teeth 11, each of which is provided on its cutting face or edge with a small generally rectangular plate or tip formation 12 which is formed of tungsten carbide or similar material having a relatively high degree of hardness and toughness. The tip formation 12 is brazed to the tooth surface and when provided with a sharpened cutting edge will resist wear and dulling to a much greater degree than the ordinary steel alloy from which the body of the saw blade is made. The tip material 12 is brazed to the cutting face of the tooth 11 in the manufacture of the blade and each tooth must be ground to remove excess material and to provide a sharpened cutting edge, with the edges of all of the tips properly aligned on each side and on the periphery of the blade. It has been found that the edge grinding or side dressing operation can be more successfully and satisfactorily carried out by removing a small portion of the surface of the tooth material at one time and repeating the grinding operation until the side face of the tip is ground down the required amount to bring it into proper alignment with the side faces of the adjacent teeth.

In the present apparatus the blade 10 is mounted on a blade supporting mechanism 13 which is arranged in proper position to present the blade 10 to a grinding wheel 14. The wheel 14 is mounted on a supporting structure 15. The blade supporting mechanism 13 and the grinding wheel supporting structure 15 are mounted on the top of a pair of connected support or base frames 16 and 17.

The grinding wheel supporting structure 15 comprises a rotatable shaft 18 having means for securing the grinding wheel 14 at its forward end. The shaft 18 is mounted in a bearing support 19 extending between the spaced upright frame members 20 and 21 of a carriage 22. A top plate 23 on the carriage 22 supports a driving motor 24 having a driving pulley 25 which is connected by means of the belt 26 with a pulley 27 on the rear end of the grinding wheel shaft 18 to rotate the grinding wheel 14. The carriage 22 includes a bottom plate 28 which is provided with spaced depending slide blocks 29 and 30. The blocks 29 and 30 are suitably apertured to receive laterally spaced supporting guide rods or bars 31 and 32 which are supported between longitudinally spaced upright bracket members 33 and 34 having a base or support plate 35 which is mounted on the top portion 36 of the supporting frame 17.

An air cylinder 37 is supported on the rear face of the upstanding plate bracket 34 and is provided with a piston 38 which extends through an aperture 39 in the plate 34 and is secured at the forward end 40 to the rear face of the slide block 30 on the carriage 22. An electrically controlled reversing valve mechanism 40 is secured to the air cylinder 37 and is operated by means of a switch 41 located on the carriage base plate 35 (Fig. 6). A pair of switch operating arms 42 are adjustably mounted in spaced relation on a supporting plate 43, the latter being secured to the ends of the depending slide blocks 29 and 30 on the carriage 22. The operating arms 42 are mounted on the plate 43 by bolts 44 which are adjustable in slots 45 and are positioned to strike the operating buttons 46 on the switch 41 as required to produce the reciprocating movement desired for the grinding wheel carriage 22. Adjustment of the arms 42, of course, varies the length of the path of movement of the grinding wheel 14. The hydraulic cylinder 37 is supplied with the necessary operating fluid, from any convenient source, by means of a connection 47 which projects rearwardly from the reversing valve 40. A curved top guard member 48 (Fig. 3) is preferably provided for the grinding wheel 14 which is adjustably supported on a bracket 49 secured to the forward edge of the carriage 22, the guard 48 being adjustably secured on the end of a pin 50 (Fig. 2) which projects forwardly of the bracket 49. A suitable cooling and lubricating fluid such as kerosene and oil may be supplied to the wheel 14 by means of a spray nozzle 51, mounted in the guard 48 and having a connection 52 with a suitable supply of the cooling mixture and air.

The supporting mechanism 13 (Figs. 1, 2, 4 and 5) for the saw blade 10 comprises a base plate 53 which is mounted on the top 54 of the main support frame 16. Plate 53 is provided with a dovetail guideway 55 extending in the same longitudinal direction as the axis of the shaft 18 for the grinding wheel 14. The dovetail guideway 55 receives a tongue or guide member 56 formed on the bottom of a supporting plate 57 which is adapted to slide in the guideway 55 in interlocked relation therewith and which is adjustable therein by means of an adjusting screw 58 which is journaled at its outer end in an upstanding end plate 59 and provided with an operating handle 60 on the outer end thereof. The screw 58 extends into a downwardly facing groove 61 in the plate 57 and engages in a nut 62 secured in the groove 61 by means of a pin 63 which extends upwardly thereof through an aperture 64 provided in the plate 57 and receives a locking nut 65. Rotation of the screw 58 moves the plate 57 in the groove or guideway 55 in a direction toward and from the grinding wheel 14. The slide plate 57 is preferably provided with a locking set screw 66 to secure the same in adjusted position relative to the base plate 53.

At its forward end the slide plate 57 supports a transversely extending cross slide plate 67 which is connected thereto by a dovetail slide comprising a transversely extending dovetail groove 68 and a cooperating dovetail tongue 69 depending from the bottom face of the cross slide plate 67. The cross slide plate 67 supports a further top or cross slide plate 70 which is mounted in superimposed relation thereon and connected thereto by a dovetail slide comprising the dovetail groove 71 in the plate 67 and the cooperating dovetail tongue 72 depending from the plate member 70. The top slide plate 70 is secured in adjusted relation on the slide plate 67 by means of an adjusting screw 73 which is journaled in an upstanding end plate 74 secured on the end of the plate 67 and which is provided with an operating handle 75. The adjusting screw 73 is connected in screw threaded relation in a threaded bore 76 in the plate 70 and may be adjusted to move the plate 70 relative to the plate 67.

The top slide plate 70 supports an upstanding angle bracket 80 having its lower end shorter leg 81 secured by bolts 82 or other fastening means to the top slide plate 70 with its longer leg 83 extending upwardly in a vertical plane in opposed relation to the plane of the grinding wheel 14 and spaced forwardly therefrom. The upstanding angle bracket member 83 and the two plates 67 and 70 which support the same are manually movable as a unit relative to the slide plate 57 by a mechanism which comprises a stud or screw 84 which is secured at one end in an aperture 85 in slide plate 67 by a pin 86, and which extends at its other end through an aperture 87 in an upstanding plate 88 secured to the end of the block or plate 57. An operating handle 89 is mounted in screw threaded engagement on the end of the stud 84 with a hub-like shoulder formation 90 engaging the outer face of the plate 88. A compression spring 89 is mounted on the screw 84 between the upstanding plate 88 and the opposed face of the slide block 67. The operating handle 89 may be turned on the end of the stud or screw 84 through a predetermined angle to move the screw 84 and the attached blade supporting members 67, 70 and 80 as a unit in the direction of the longitudinal axis of the stud 84, toward the plate member 88 and transversely of the base plate member 53 while the spring 91 functions to return the members to their initial position upon return or reverse movement of the operating handle 89 on the stud 84.

The upstanding leg 83 of the bracket 80 supports on its forward face a base block 92 forming a portion of a carriage for the saw blade 10. The base block 92 is connected in slidable relation with the bracket leg member 83 by a dovetail slide consisting of a dovetail groove 93 in the vertical face of the member 83 and cooperating dovetail tongue 94 on the block 92. The block 92 is provided with a pair of threaded studs 95 which extend through vertical slots 96 in the member 83 and which are provided with lock nuts 97 to secure the block 92 in vertical adjusted relation on the member 83. The base block 92 is adjusted vertically by means of an adjusting screw 98 which is engageable in screw threaded relation in a suitable bore 99 in the block 92 and which is journaled at its upper end in a top plate member 100 secured by bolts or other fastening elements on the top of member 83. An operating handle 98' is provided on the upper end of the screw 98. The saw blade carriage includes a bearing housing 101 extending forwardly of the base block 92 and receiving suitable mounting members for a shaft 102 on the outer end of which the blade 10 is mounted. The shaft 102 is provided with a suitable bearing hub 103 for the blade 10 with a portion 104 of reduced diameter extending through the arbor hole 105 in the saw blade and a similar hole in a clamp plate 106. A clamping nut 107 is provided on the threaded outer end portion of the shaft 102. The shaft 102 may be rotatably mounted in the bearing housing 101 in any conventional manner. As shown, the shaft 102 is tapered and mounted in taper roller bearings 108 secured within the housing 101 and provided with a locking screw 109 having a handle 110 thereon for securing the same in a set position. The mounting provides for rotation of the shaft and resists stress in the axial direction of the shaft 102.

An indexing device for positioning the saw blade for the grinding operation is supported on the grinding mechanism 15 by means of a slotted bracket member 111 adjustably secured to the face of the upstanding plate 33 by a stud bolt 112. At its upper end the bracket plate 111 carries on a pivot bolt 113 a transversely extending arm 114 which is apertured at its free end 115 to receive a post 116 extending in a generally vertical direction and secured in the aperture in adjusted relation by a clamping set screw 117. The post 116 is provided at its upper end with a spring actuated pivotally mounted dog 118 having a curved or hooked outer end thereof urged by its spring 119 into the path of rotation of the saw blade 10 adjacent the outer periphery thereof. The dog 118 is urged by its spring 119 in a clockwise direction toward the blade 10 and will permit the teeth to pass the end of the dog and move the same out of the path thereof, when the blade 10 is rotated in the clockwise direction, but, when the direction of rotation of the blade 10 is reversed, the end of the dog 118 engages with the trailing face of the tooth and prevents rotation in the counterclockwise direction thereby permitting the saw blade to be properly indexed to bring into proper position for grinding each successive tooth.

In the operation of the machine the blade 10 is clamped to the end of the shaft 102 and the members of the supporting carriage for the blade 10 are adjusted, with the use of measuring gauges, so that operation of the handle 89 will move the face of the blade confronting the grinding edge of the grinding wheel 14 into a predetermined final position when the supporting plate 67 is moved by the handle 89 to the innermost position, the carriage being simultaneously adjusted vertically to bring it to the required height, depending upon the character of the blade and the location of the tooth or tip surface which is to be ground. The handle 89 is turned to position the supporting plate 67 at the outermost limit of its transverse movement and the indexing dog 118 is adjusted so that when it engages a tooth on the blade the side face of the tip 12 will be located slightly below the center of rotation of the grinding wheel 14 to give the finished face a bevel for clearance when the blade is operated as a cutting element. The grinding wheel 14 and its reciprocating carriage 22 are then set in operation. Thereafter the handle 89 is turned by the operator gradually to move the side face of the tip 12 which is to be ground into the path of operation of the edge of the grinding wheel 14, the dog 118 holding the blade against counterclockwise movement which would otherwise result due to the engagement of the rotating grinding wheel. The rapid reciprocation of the carriage 22 causes the grinding wheel 14 to pass over the surface of the tip portion on the tooth a sufficient number of times to remove the excess tip material as the operator gradually moves the saw blade towards the grinding wheel. When the blade has reached its innermost limit of movement the operator can observe that the grinding operation is completed and the blade is returned to the other end of its path by operation of the handle 89, after which the blade 10 is indexed to bring the next tooth thereon into grinding position and the grinding operation is repeated until all of the teeth have been ground.

All of the members supporting the blade 10 are adjustable at the start of the operation so that the blade may be located in the proper relation to the grinding wheel 14 to dress the tip of each tooth the proper amount upon movement of the blade toward the grinding wheel, resulting in each tooth being ground so that the side edge of each tip is properly aligned with the side edges of the tips on the adjoining teeth. The tips are all ground on one side face and the blade is then reversed to grind the same on the opposite side face. the ground faces of each tip are each provided with a bevel which extends from the outer cutting edge inwardly toward the trailing inner edge of the tooth and the plane of the blade by positioning the tip above or below the center of the grinding wheel for the grinding operation, as required.

While the mechanism is shown with a grinding wheel 14 having a beveled edge it will be obvious that a different edge configuration may be employed. It will also be obvious that the multiple adjustments of the support for the blade will permit the mechanism to be adjusted to adapt the same for grinding the teeth of blades of different character.

While specific details of construction and particular materials are referred to in describing the illustrated form of the invention it will be understood that other details of construction and other materials may be resorted to within the spirit of the invention.

I claim:

In a saw grinding machine a supporting frame, a bracket member, a base member having relatively adjustable portions to permit initial adjustment of said bracket member, said bracket member being mounted on said base member and said base member being slidably mounted on said supporting frame, manually controlled means for moving said base member in a predetermined path, a shaft rotatably mounted on said bracket member and extending parallel to the path of movement of said bracket and means for clamping a saw blade on said shaft whereby the position of said blade may be adjusted and said blade may be rotated about its axis, readily releasable means for securing said blade against rotation relative to said bracket member, a grinding wheel, a shaft for supporting said grinding wheel with the grinding surface thereof positioned opposite the surface of the blade which is to be ground, a carriage reciprocably mounted on said supporting frame, said grinding wheel shaft being mounted in rotatable relation on said carriage, means for rotating said grinding wheel shaft, means for rapidly reciprocating said carriage, and a combination indexing and abutment device having a spring pressed member engaging the blade when it is rotated about its axis to hold successive teeth in position for engagement by the grinding wheel, said base member being moved in its path by said manually controlled means to gradually bring said blade toward said grinding wheel for repeated grinding operation on each successive tooth and thereafter to move said blade out of the path of movement of said grinding wheel.

References Cited in the file of this patent

UNITED STATES PATENTS

| | | |
|---|---|---|
| 1,051,153 | Nelson | Jan. 21, 1913 |
| 1,165,873 | Hagenmuller | Dec. 28, 1915 |
| 1,376,953 | Lindholm | May 3, 1921 |
| 1,662,079 | Severson | Mar. 13, 1928 |
| 1,679,413 | Einstein | Aug. 7, 1928 |
| 1,770,148 | Stevens | July 8, 1930 |
| 1,796,663 | Osgood | Mar. 17, 1931 |
| 1,880,736 | Booth | Oct. 4, 1932 |
| 2,018,847 | Fraser | Oct. 29, 1935 |
| 2,401,165 | Knapp | May 28, 1946 |
| 2,414,182 | Wessmann | Jan. 14, 1947 |